United States Patent [19]

Ronning et al.

[11] Patent Number: 5,380,961
[45] Date of Patent: Jan. 10, 1995

[54] DEVICE FOR CONNECTING THE CONTACT CABLE FOR VEHICLES RUNNING ON RAILS

[75] Inventors: Trond A. Ronning, Svorkmo; Terje Skjetne, Trondheim, both of Norway

[73] Assignee: Oy Sekko AB, Borgaa, Finland

[21] Appl. No.: 861,815

[22] PCT Filed: Dec. 20, 1990

[86] PCT No.: PCT/NO90/00193
§ 371 Date: Apr. 30, 1993
§ 102(e) Date: Apr. 30, 1993

[87] PCT Pub. No.: WO91/08923
PCT Pub. Date: Jun. 27, 1991

[30] Foreign Application Priority Data

Dec. 20, 1989 [NO] Norway ............... 895135

[51] Int. Cl.6 ........................ B60M 5/00
[52] U.S. Cl. ........................ 191/41; 191/40
[58] Field of Search ......... 104/117; 191/33 R, 40, 191/41, 42, 43, 44; 403/DIG. 7, 273, 338, 373

[56] References Cited

U.S. PATENT DOCUMENTS

| 418,704 | 1/1890 | Duggan | 191/40 |
| 506,043 | 10/1893 | Hoopes | 191/40 |
| 3,502,351 | 3/1970 | Gray | 403/373 |
| 3,641,285 | 2/1972 | Tustin et al. | 191/40 |
| 3,975,580 | 8/1978 | Lewis | 191/40 |
| 4,679,672 | 7/1987 | Seddon et al. | 191/40 |

FOREIGN PATENT DOCUMENTS

| 0414083 | 8/1918 | France | 191/40 |
| 0186530 | 11/1982 | Japan | 191/40 |
| 0841090 | 7/1960 | United Kingdom | 191/41 |
| 2170160 | 7/1986 | United Kingdom | 191/41 |

*Primary Examiner*—Mark T. Le
*Attorney, Agent, or Firm*—Antonelli, Terry, Stout & Kraus

[57] ABSTRACT

A device for suspending a contact cable for vehicles running on rails which includes an upper tension rod connected to a support mast, a compression rod connected to the support mast to hold up a free end of the tension rod. A lower horizontal rod is jointly linked to the compression rod and supports and jointed direction rod adapted to contact the contact cable. An inner axially movable rod is telescopically inserted in the tension rod with a clamped sleeve surrounding the tension rod. The inner axially movable rod is adapted to be locked in an axial position by a clamping force applied by the clamping sleeve.

4 Claims, 3 Drawing Sheets ature to be fitted in a compact packing, so that it can just be fitted.

DEVICE FOR CONNECTING THE CONTACT CABLE FOR VEHICLES RUNNING ON RAILS

FIELD OF THE INVENTION

The present invention relates to a device for suspending a contact cable for vehicles running on rails and, more particularly, to suspending the contact cable for trains.

BACKGROUND OF THE INVENTION

The purpose of a device for suspending contact cable or a so-called "suspension unit" is to maintain the supporting cable and the contact cable in the correct position with respect to the rails. The supporting cable acts as an attachment for suspension wires that maintain the contact cable at a reasonably constant height above the rails. Both cables are under tension which is usually at a force of about 1-1.5 tonnes.

A known suspension unit for vehicles running on rails, particularly trains, generally includes an upper tension rod connected to a support mast, a compression rod connected to the support mast to hold up a free end of the tension rod, which carries a supporting cable and a lower horizontal rod that has a jointed link to the compression rod, with the horizontal rod supporting a joint direction rod where the contact cable is suspended at the free end. As this type of suspension unit has to be adjusted to different distances between the mast and the center of the rails, the rods are adjusted by being cut into suitable lengths before they are put together.

When known or conventional suspension units are used, they will consequently demand a considerable amount of preliminary adjustments which are usually carried out in a workshop, before being taken to the place where they are to be fitted. This is an expensive and time consuming process.

In a known type of suspension unit, the connection bracket for the supporting cable is jointed with the clamp connection between a tension rod and a compression rod. Adjustment of a length of the suspension unit, for example, the horizontal distance between the mast and where the supporting cable is attached, is thus restricted, difficult and time consuming.

Another known suspension unit utilizes a similar clamp connection between a tension rod and a compression rod and a separate movable attachment for the supporting cable on the tension rod. The horizontal adjustment of the supporting cable is thus easier, but an extra clamp is required which increases the cost. The vertical adjustment of the supporting cable point difficult and time-consuming with both these solutions.

When changing and refurbishing cables, trains have to be stopped while the existing lines are removed and replaced by new ones. This work is made more efficient by using special-purpose vehicles with lifting equipment designed for the removal of old suspension units; fitting, stretching and loading new cables. This work nevertheless partially involves manual handling of the suspension unit. Existing suspension units in this context have been unnecessarily complex and have created problems with respect to the regulations governing the work environment. A general problem with known solutions is that they are time-consuming to implement so that the effective working time on lines, which has to be done between each passing train, is extremely short. Existing suspension units also have a variety of connections and clamps, which results in a large inventory of costly equipment in storage and expensive material administration.

SUMMARY OF THE INVENTION

The aim underlying the invention is to provide a suspension unit that can be made ready for fitting by the manufacturer and transported to where it is to be used in a compact packing, so that it can just be fitted.

Further, it should be easy to adjust to different mast positions, and simple to make vertical and horizontal adjustments.

Another objective is also to reduce the weight of the elements in the suspension unit and also reduce the number of types of fittings and insulators in the system. A further consideration is seeking to use lightweight materials, such as aluminium, in bars and rods and use new insulator concepts, such as thosebased on artificial materials that can be incorporated in new total concepts for refurbishing and building new lines.

In accordance with advantageous features of the present invention, a device for suspending a contact cable for vehicles running on rails is proposed wherein an outer end of the tension rod is connected to a clamped sleeve that surrounds the tension rod, and an inner axial movable rod to which the supporting cable is attached can be locked in the required axial position by a clamp sleeve.

In accordance with further features of the present invention, the axially movable rod is telescopically arranged in the tension rod and is inserted in the tension rod so that it protrudes outwardly as a support for the supporting cable. An outer end of the tension rod is connected to a clamped sleeve with a downward clamp that surrounds the outer end of the tension rod. The clamped sleeve is activated by a threaded bolt. The clamped sleeve is fixed to the tension rod by the threaded bolt and a gap in the clamp is provided for the compression rod with the gap being so constructed that the clamping is only activated when the end of the tension rod is clamped tightly on the telescopic rod.

The clamped sleeve may be fitted with an attachment for a tool that is used to control the total extension of the tension rod.

According to further features of the present invention, insulators, having identical fittings, are provided to the tension and compression rods.

A cable connection in accordance with the invention can be assembled before fitting and put together so that it takes minimal space during storage and transport to the place it is to be fitted. The design makes this feasible through the use of aluminium, so that the weight can be considerably reduced. This simplifies the handling of the suspension unit and makes it easier to carry out the work manually.

Employing the designs described in the subsidiary claims, enables simple manual adjustments to be made to the telescopic part of the tension rods without any external tools.

BRIEF DESCRIPTION OF THE DRAWINGS

The invention will now be described below with reference to the accompanying drawings wherein.

DETAILED DESCRIPTION

Figure 1:
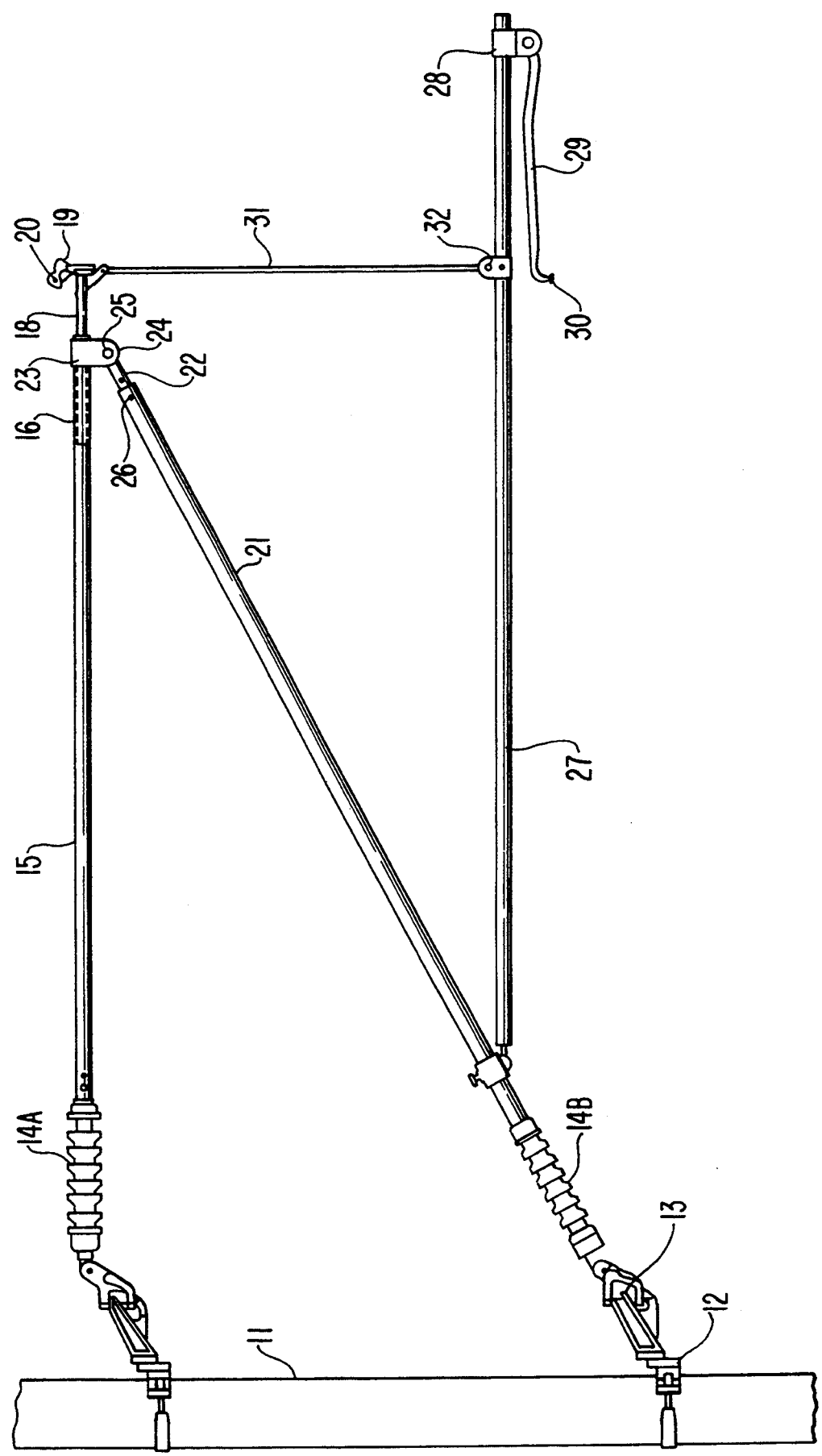
FIG. 1 is a lateral schematic view of a cable suspension unit constructed in accordance with the present invention.
Figure 2:
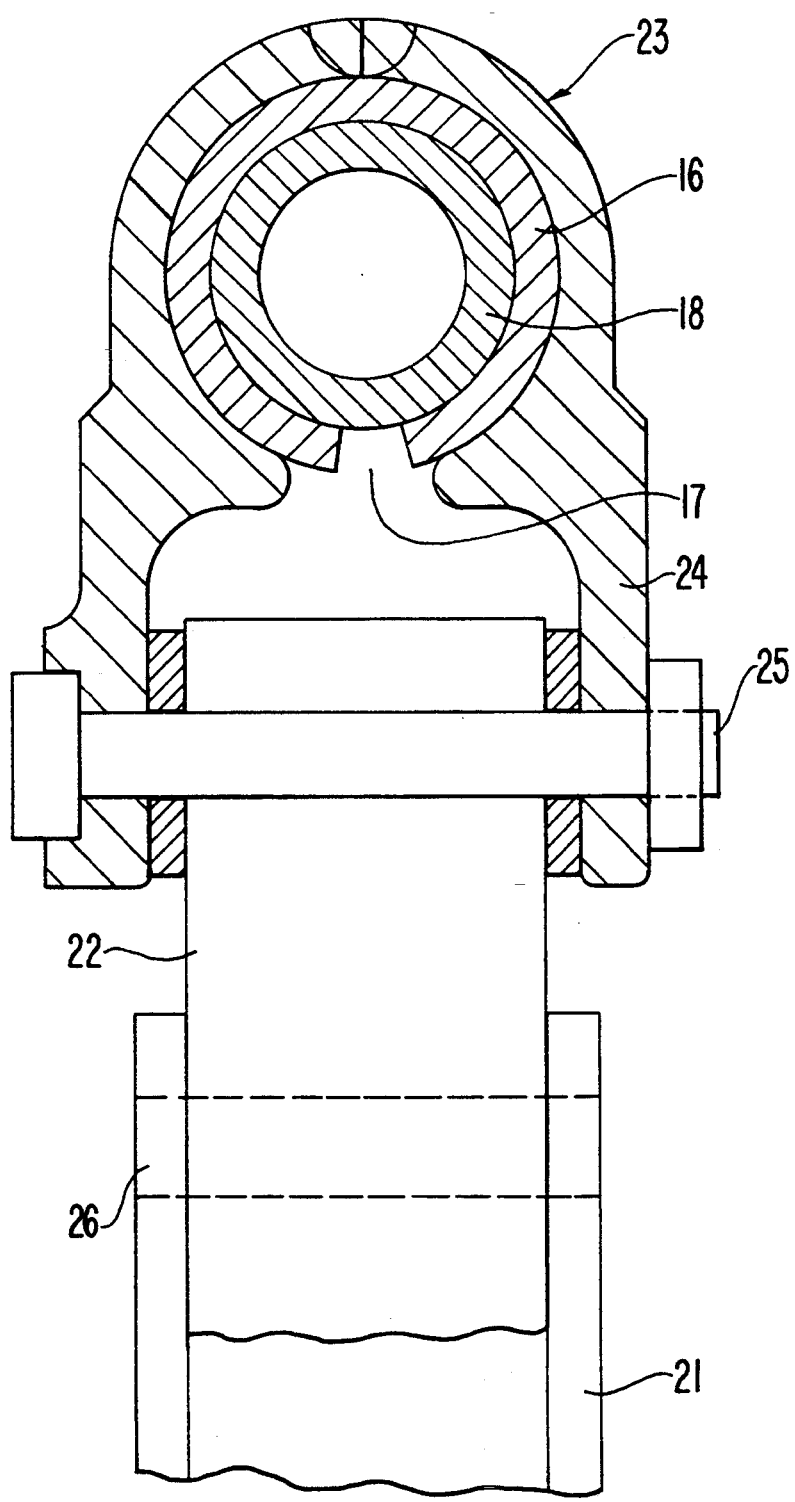
FIG. 2 is a cross-sectional view through a clamp which may be used to join the cable suspension unit of FIG. 1.

The suspension unit in the example illustrated in FIG. 1 is attached to a support mast 11. Using clamps 12 and attachment links 13, electric insulators 14A and 14B are connected at an upper and lower point respectively. The insulators 14A, 14B can either be made of conventional ceramics or artificial materials. If insulators of artificial materials are used, such insulators can be identical and may be attached by pivots. An upper tension rod 15, made of a tubular material, is axially-connected to the upper insulator. At the outer end 16, the upper rod has a part of its underside cut away or is formed as a notch 17 as shown in FIG. 2, and at this end and outer part or end rod 18 is telescopically inserted into the tension rod 15. A clamp 19 is provided at a free end of the outer part or end rod 18 to secure a supporting cable 20. The supporting cable 20 stretches along a railway track, and the telescopically supported end rod 18 is axially adjusted so that the supporting cable is always in the correct position with respect to the center of the track.

From the lower diagonal insulator 14 there is an axial compression rod 21 pointing diagonally upwards. This rod is made of tubular material. At the upper end of the compression rod 21 there is a sleeve 22 with a continuous hole that can be locked by a pin 26. The compression rod 21 is connected to the tension rod 15 by a clamped sleeve 23 that is shown in more detail in FIG. 2. The clamped sleeve 23 is fixed to, or alternatively can be released from, the tension rod 15 and includes a downwardly extending clamp surrounding the outer end 16 of the tension rod. The open part 24 of the clamp has a bolt 25 through it that holds it firmly around the sleeve 22. Alternatively the sleeve 22 can be removed and the compression rod led inside the clamped sleeve 23 if it is not necessary to make any vertical adjustment of the compression rod.

The clamped sleeve 23 and the telescopically adjusted parts of the tension rod 15 are designed so that there is clamping action against the telescopic parts before the sleeve 22 is clamped tightly and locks the angle between the tension rod 15 and the compression rod 21. This means that the cable suspension unit can be transported to the place it is to be used while folded with the inner telescopic part or rod 18 already in the correct position without any risk. The lateral adjustment of the supporting cable connection can be effected from the compressed position of the telescopic part by carefully loosening the bolt 25 without having to lift the supporting cable off the tension rod. With known solutions it is necessary to lift the supporting cable off before the tension rod can be adjusted.

Facing away from the lower insulator 14B, and connected to the compression rod 21 with the same clamp 23, a horizontal rod 27 of tubular material is connected so that it can pivot. On the outer end of the horizontal rod there is a clamp 28 that is similarly shaped to clamp 23 that can be locked in the correct axial position by a bolt. The bolt pivots on the end of a direction rod 29 that has a clamp on its inner, free end for a contact cable 30.

The horizontal rod 27 is suspended from the connection of the supporting cable by a wire 31 connected to a clamp 32. The contact cable 30 and the supporting cable 20 are connected by suspension wires in a conventional manner.

The present device has numerous advantages compared known suspension units. Both horizontal and vertical adjustment of the connection of the supporting cable can be accomplished by simply loosening the bolt 25. The clamp 23 can be used as a general attachment and contact clamp in the system, this can possibly be supplemented by other variants. The entire device can be folded together when stored, under transport and when being handled so that it is a compact unit. When it arrives at the place it is going to be used, it can be mounted and locked into position just by adjusting a single bolt.

It has been found that it is feasible to manufacture the device with bars and diagonal rods in tubular aluminium and thereby reduce the weight considerably compared to known devices with similar dimensions. The device is also suited to be used with modern unbreakable low weight insulators, the so-called composite insulators that can be attached to the rod by a bolt and pin connection. With this type of insulators, the suspension unit complete with insulators, can be handled manually and transported without any danger of breakage. A great advantage of the present invention is that both insulators can be designed with identical fittings at each end.

Figure 3:
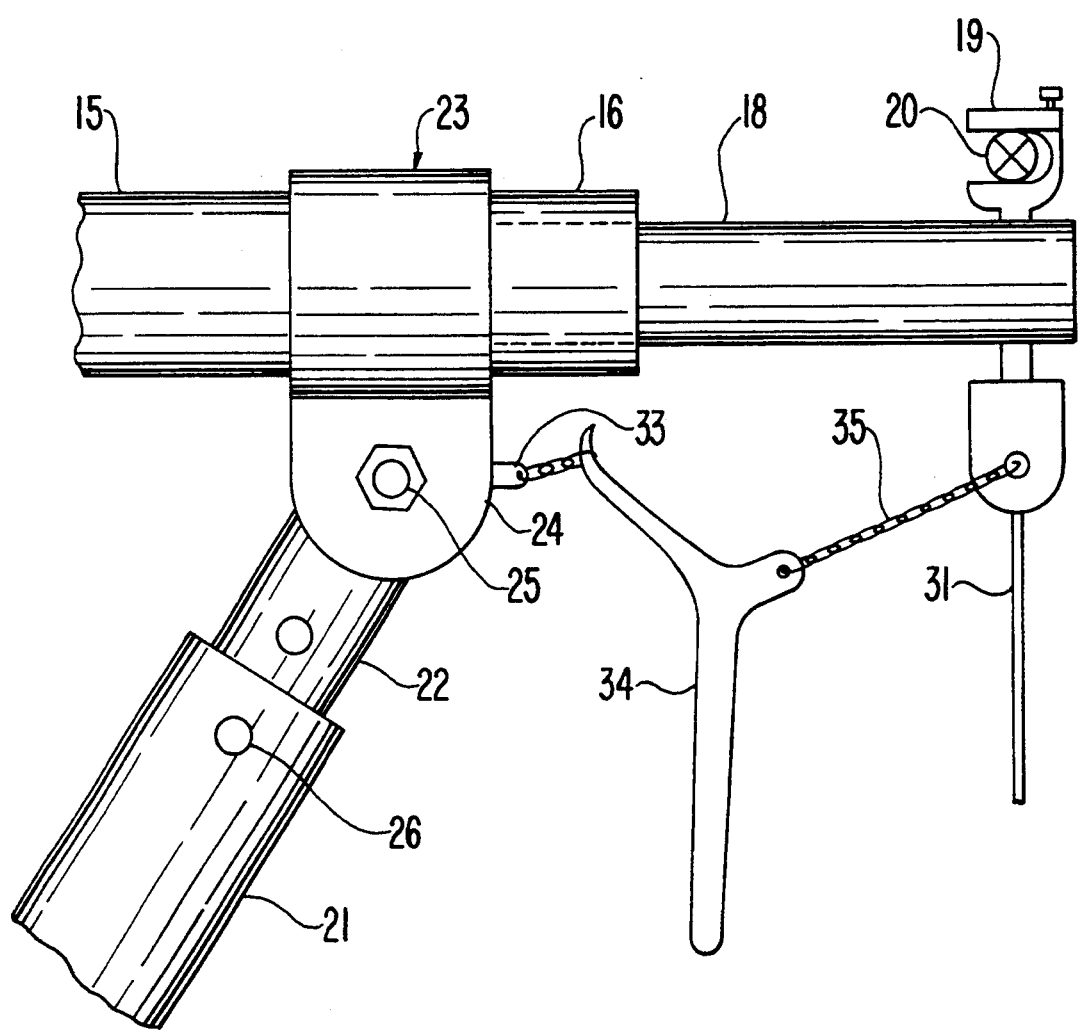
FIG. 3 is a schematic view of one example where a tool is used to control the extension of the suspension unit.

FIG. 3 shows a modified version of the invention, where the clamped sleeve 23 has an external hook 33. This gives an attachment for the end of a weighting rod 34 that is connected to the supporting cable clamp 19 by a chain 35. The suspension unit can be delivered with a compressed telescopic rod 18. When being mounted, the tension in the supporting cable 20 will force the telescopic rod to extend when the clamped sleeve 23 is released. The telescopic rod 18 can be pulled in manually with the weighting rod 34 to control the extension length.

We claim:

1. A device for suspending a contact cable for a vehicle running on rails, the device comprising an upper tension rod, a compression rod, a support mast for holding up a free end of the upper tension rod, a lower horizontal rod jointly linked to the compression rod and supporting a jointed direction rod adapted to contact the contact cable, said compression rod is connected to the support mast, wherein a clamped sleeve surrounds the upper tension rod in an area of a free end thereof, an inner axially movable rod, telescopically inserted into the tension rod, supports a supporting cable, and wherein the inner axially movably rod is adapted to be locked in an axially adjusted position by a clamping force applied by said clamping sleeve.

2. Device as claimed in claim 1, wherein the clamped sleeve includes a downwardly extending clamp surrounding an outer surface of the tension rod at the free end of the tension rod, a threaded bolt is provided at the clamped sleeve for activating the clamped sleeve so as to apply the clamping force, and wherein a gap is provided in the downwardly extending clamp with the gap being constructed so that the clamping force is only activated when the free end of the upper tension rod is clamped tightly on the axially movable rod.

3. Device according to one of claims 1 or 2, wherein the clamped sleeve includes an attachment for accommodating a tool used for controlling a total extension of the axially movable rod.

4. Device according to one of claim 1 or 2, wherein insulators, having identical fittings, are provided to the tension and compression rods.

* * * * *